W. Woodbury.
Elastic Coupling.
Nº 43,150. Patented Jun. 14, 1864.
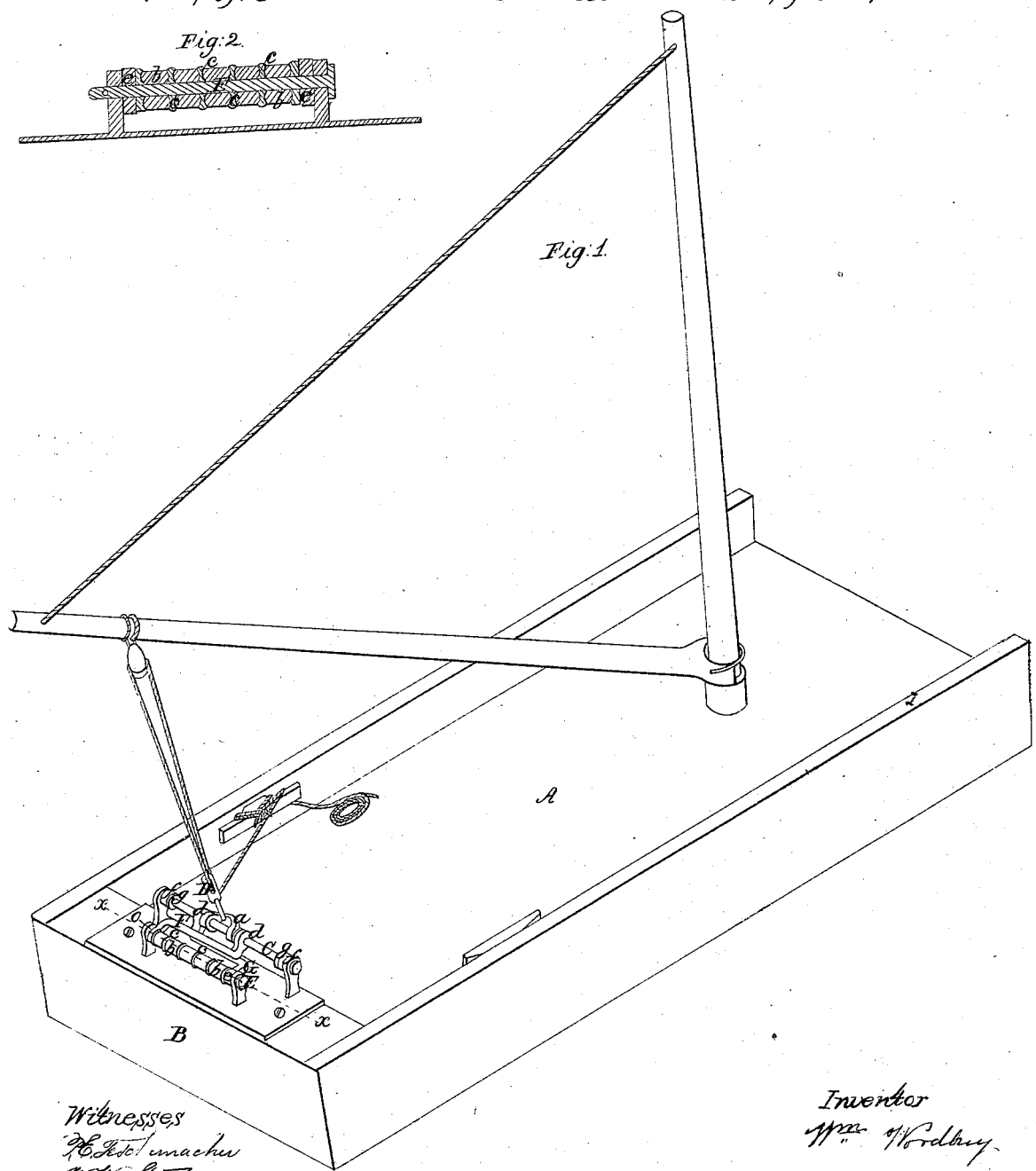

UNITED STATES PATENT OFFICE.

WILLIAM WOODBURY, OF GLOUCESTER, MASSACHUSETTS.

IMPROVED TACKLE FOR FORE AND AFT SAILS.

Specification forming part of Letters Patent No. 43,150, dated June 14, 1864.

*To all whom it may concern:*

Be it known that I, WILLIAM WOODBURY, of Gloucester, in the county of Essex and State of Massachusetts, have invented certain Improvements in the Tackle of Fore and Aft Sails of Vessels, of which the following is a full, clear, and exact description, reference being had to the accompanying drawings, making part of this specification, in which—

Figure 1 represents the deck of a vessel with the mast and boom and my improvements applied thereto; Fig. 2, an enlarged section through the india rubber springs $b$ on the line $x$ $x$ of Fig. 1.

My invention relates to an improvement in the tackle of fore and aft sails of vessels for which Letters Patent of the United States were granted to me on the 19th day of March, 1861, in which an india-rubber spring was placed on the traveler-rod on each side of the loop to which the traveler-block was attached, so as to prevent the sudden jar caused by the shifting of the boom and to relieve the strain on the sheet. These springs were necessarily made very thick and heavy, thereby increasing their cost, and owing to their length were liable to be turned under on the rod or crushed by the great pressure and violent jerks to which they were subjected as the boom passed over from one side of the vessel to the other.

The object of my present invention is to avoid these objections and to reduce the cost of the apparatus; and consists in placing a series of short springs with washers between them on a separate rod, parallel to the traveler-rod, and connecting these springs with the loop to which the traveler-block is attached, by means of bent rods, whereby the length of the traveler-rod can be reduced and a much shorter length of springs employed than heretofore, thus reducing the cost to a considerable extent.

To enable others skilled in the art to understand and use my invention, I will proceed to describe the manner in which I have carried it out.

In the said drawings, A represents the deck of a vessel; B, the stern, to which is attached the traveler C. This is a stout rod of iron, the ends of which are secured to eyebolts, so that the rod C will be raised a few inches from the stern, and on this rod slides a loop, $a$, to which is attached the traveler-block D. Close to and paralled with the rod C is a similar rod, E, but somewhat shorter and of less diameter, which is encircled by a series of short rubber tubes, $b$, forming springs, which are separated from each other by washers $c$, the faces of which are made with a groove, as seen in Fig. 2, which serves to keep the springs in place and prevents them from turning under on the rod when they are subjected to a severe pressure.

F G are two rods, the ends $d$ $e$ of which are bent, as seen in Fig. 1, and encircle the rods C and E, the latter on either side of the springs $b$. These rods F G cross each other and confine between their ends $d$ the loop $a$, to which the traveler-block is attached, and by this arrangement of the bent rods, as the loop $a$ is drawn to either side by the sheet, the rubber springs $b$ are compressed by the rods F or G, and the sheet is thus relieved from the sudden jerk and strain usually received when the boom swings over to either side as the sail fills.

$f$ are short rubber springs on the traveler-rod C, having washers $g$ on the inner side, which serve as stops, against which the ends $d$ of the bent rods F and G strike, so as to prevent too great a pressure on the springs $b$. It will thus be seen that by placing the springs $b$ on a separate rod, E, instead of on the traveler-rod, I am enabled to make them much shorter and of less diameter, the rod E being about half the diameter of the traveler-rod C, and thus greatly reduce the cost; and as the whole length of the spring is utilized in whichever direction the traveler-block is moved the traveler-rod C may be made much shorter than heretofore, which will prevent it from springing in the center of its length. I find that where twenty-two pounds of rubber springs were necessary, when arranged as in my former patent, but eight pounds are required when placed on a separate rod, as above described, and the cost of the whole apparatus is reduced more than one-half. The durability and effectiveness of these springs is also materially increased by the employment of the grooved washers above described.

If desired, some other spring may take the place of the rubber springs; but I prefer the rubber as less liable to damage from wet.

What I claim as my invention, and desire to secure by Letters Patent, is—

1. Placing the springs $b$ on a rod, E, parallel to the traveler-rod C, substantially in the manner and for the purpose set forth.

2. Forming the springs $b$ in short sections, with the washers $c$ interposed, substantially in the manner and for the purpose set forth.

WM. WOODBURY.

Witnesses:
  P. E. TESCHEMACHER,
  N. W. STEARNS.